United States Patent
Floyd et al.

(10) Patent No.: US 6,643,796 B1
(45) Date of Patent: Nov. 4, 2003

(54) METHOD AND APPARATUS FOR PROVIDING COOPERATIVE FAULT RECOVERY BETWEEN A PROCESSOR AND A SERVICE PROCESSOR

(75) Inventors: Michael Stephen Floyd, Leander, TX (US); Kevin F. Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,663

(22) Filed: May 18, 2000

(51) Int. Cl.[7] .............................................. G06F 11/00
(52) U.S. Cl. ......................................... 714/10; 712/227
(58) Field of Search ................................. 714/10, 31, 4, 714/2; 712/227

(56) References Cited

U.S. PATENT DOCUMENTS

| | | | | |
|---|---|---|---|---|
| 4,703,446 A | * | 10/1987 | Momose | ...................... 702/119 |
| 5,649,090 A | * | 7/1997 | Edwards et al. | ............... 714/10 |
| 5,805,790 A | * | 9/1998 | Nota et al. | ..................... 714/10 |
| 5,884,023 A | * | 3/1999 | Swoboda et al. | .............. 714/30 |
| 6,185,732 B1 | * | 2/2001 | Mann et al. | ................. 717/128 |
| 6,263,373 B1 | * | 7/2001 | Cromer et al. | .............. 709/250 |
| 6,311,292 B1 | * | 10/2001 | Choquette et al. | ............ 714/30 |
| 6,378,027 B1 | * | 4/2002 | Bealkowski et al. | ........ 710/302 |
| 6,499,113 B1 | * | 12/2002 | Tobin et al. | ................... 714/19 |

* cited by examiner

*Primary Examiner*—Robert Beausoliel
*Assistant Examiner*—Christopher S. McCarthy
(74) *Attorney, Agent, or Firm*—Casimer K. Salys; Bracewell & Patterson, L.L.P.

(57) ABSTRACT

A method and apparatus for providing cooperative fault recovery between an operating system and a service processor allows fault detection and recovery capability utilizing a service processor while an operating system is running on a main processor. A register is provided within the main processor component for sending information to the service processor. An attention signal is provided to the service processor to indicate that the operating system has written information to the register and is requesting the service processor's attention. A JTAG standard interface is used to access the register from the service processor and an interrupt is provided to the operating system to indicate that the service processor has written information to the register and is requesting the operating system's attention.

13 Claims, 5 Drawing Sheets

METHOD AND APPARATUS FOR PROVIDING COOPERATIVE FAULT RECOVERY BETWEEN A PROCESSOR AND A SERVICE PROCESSOR

BACKGROUND OF THE INVENTION

1. Technical Field

The present invention relates generally to computer systems, and more specifically to a computer system having a central processing system and a service processor. In particular, the present invention allows a service processor and central processor to cooperate in fault recovery via registers within the central processing system accessible through a test port interface and interrupts provided to the central processing system.

2. Description of the Related Art

Modern computer systems have grown sufficiently complex that secondary service processors are used to provide initialization of the computer systems, component synchronization and, in some cases, startup assistance to components that do not completely self-initialize. In addition, data values and instructions are pre-loaded, and out-of-order execution is supported, making synchronization and reliability of the processing cores critical to proper operation. When an error occurs, re-synchronizing the contents and coherence state of all of the caches in a computer system can be a complex tracing problem. In addition, other errors may occur in systems components in which error detection may be made by an operating system running on a main processor, but a recovery mechanism is only available to the service processor. Likewise, the service processor may be able to detect an error, but the operating system may need information to either attempt recovery or participate in a recovery mechanism engaged by the service processor. For example, the service processor may be able to reset a cache memory controller while a main processor may not, but the contents of cache must be flushed by the operating system so that the system memory image is not corrupted.

As the speed of processors increases, the use of dynamic circuits and asynchronously timed interconnects force modern processing system designs toward fault tolerant operation. In addition, processing systems must be designed to handle certain fault rates, as opposed to past processing systems in which a single fault usually requires halting execution of a processor to wait for the correction of the fault. Fault tolerance in the past has been directed at handling software faults that occur due to the difficulty of handling all combinations of execution that might occur on one or more processors in a particular sequence of instructions. The new trends in circuit designs increase the need for tolerance of hardware faults, which have been corrected in the past by a hardware reset.

The need for fault tolerant designs comes in part from the increasing demand for reliability and increasing processing speeds from consumers. One way to increase the rate at which a circuit can evaluate the next state in a computational engine is to permit an increase in the error rate for that evaluation.

A single processor system can easily reset the processor core. For a multiprocessor system, core-resetting is not a simple operation, as the interdependencies of memory values based on cache storage raise the potential to corrupt computations being performed on the entire machine. In addition, core-resetting typically requires shutdown and subsequent restart of the operating system.

In light of the foregoing, it would be desirable to provide a method and apparatus for fault recovery in a multiprocessing system.

SUMMARY OF THE INVENTION

A data-processing system includes a service processor and a main processor communicating via an operating system and an interface register within the main processor that can be accessed through a test port interface.

The data-processing system also includes at least one memory, a test port for coupling the main processor to the service processor, and an interface register within the main processor coupled to the test port for exchanging information between the operating system and the service processor. An interrupt connection from the interface register to the main processor execution units provides an indication to the operating system so that information written by the service processor via the test port may be provided to the operating system without polling. Additionally, an attention indication to the service processor is triggered by the operating system writing information to the interface register, such that the service processor may retrieve the information.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF AN ILLUSTRATIVE EMBODIMENT

Figure 1:
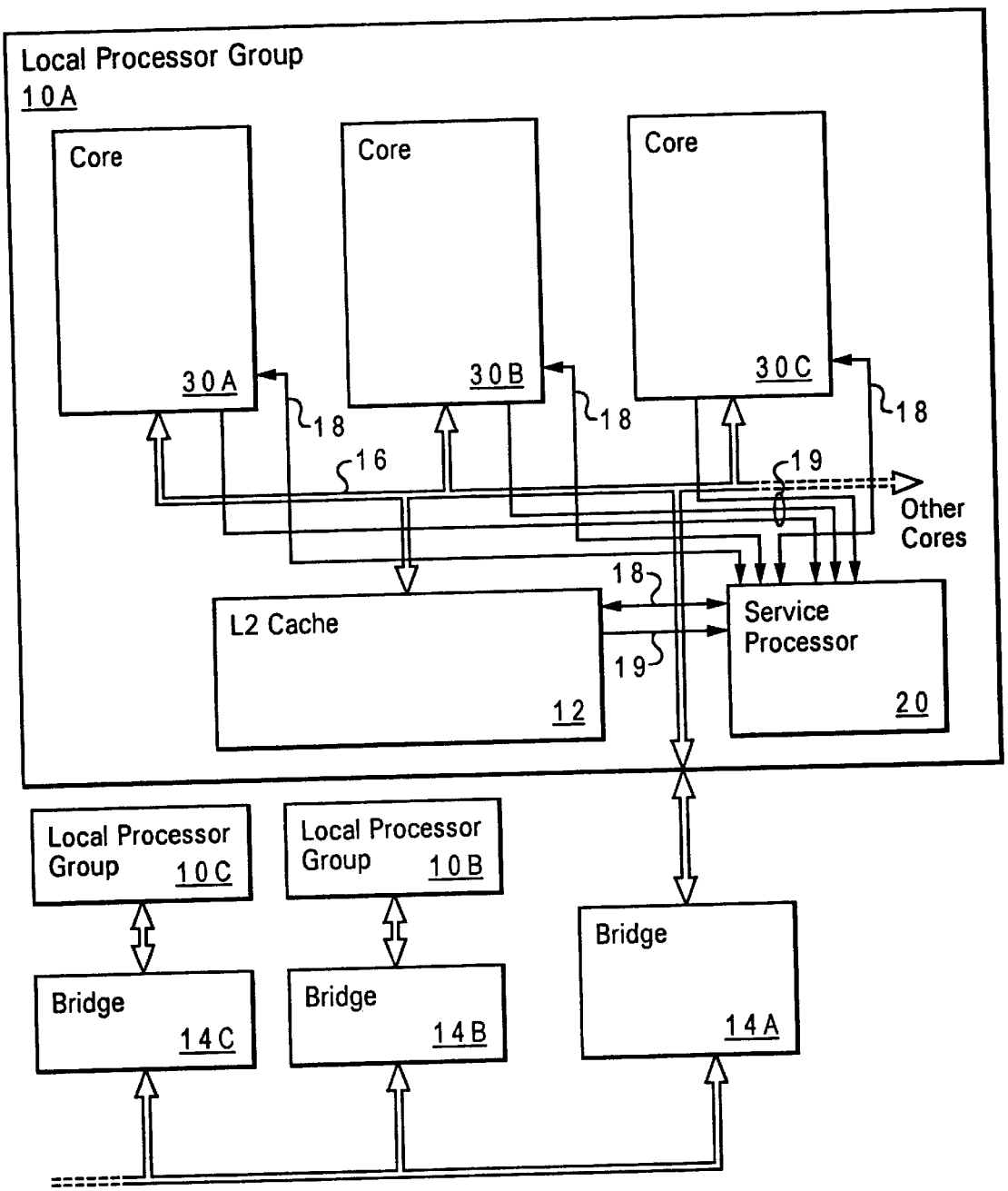
FIG. 1 is a block diagram of a multiprocessor system, in accordance with a preferred embodiment of the present invention.

With reference now to the figures, and in particular with reference to FIG. 1, there is shown a multiprocessor system in accordance with a preferred embodiment of the present invention. The multiprocessor system is a connection of local processor groups 10 that perform program operations. This arrangement is particularly useful for scalar mathematical operations such as array multiplication and inversion. Local processor groups comprise cores 30A–30C that may contain caches or other local storage and the processor groups share a level of cache or memory, specifically L2 cache 12 in this example, that can be accessed by all of the processors in a group, and optionally by other local processing groups through bridges 14. Cores 30, are coupled together, to L2 cache 12, and to bridge 14A, by local bus 16.

Service processor 20 provides supervisory and error recovery operation in accordance with the present invention via a Joint Test Action Group (JTAG) interface. The details of the JTAG interface are defined by IEEE (Institute of Electrical and Electronics Engineers) standard 1149.1— IEEE Standard Test Access Port and Boundary Scan Architecture. The interfaces used are not restricted to JTAG type interfaces, but it is convenient to use the JTAG hardware layer and protocols substantially compatible with the JTAG standard interface in order to provide compatibility with test equipment commonly available at present.

Service processor 20 is coupled to cores 30A–30C and L2 cache 12 by attention lines 19 and JTAG connections 18. JTAG connections 18 allow control of registers and functions within cores 30 and L2 cache 12 such as boundary scan registers and control bits within the functional blocks included in cores 30 and L2 cache 12.

Attention lines 19 are used by the individual processing system components interfaced to service processor 20 to signal for attention. The service processor may then respond by querying status and taking necessary remedial action via JTAG connections 18.

Figure 2:
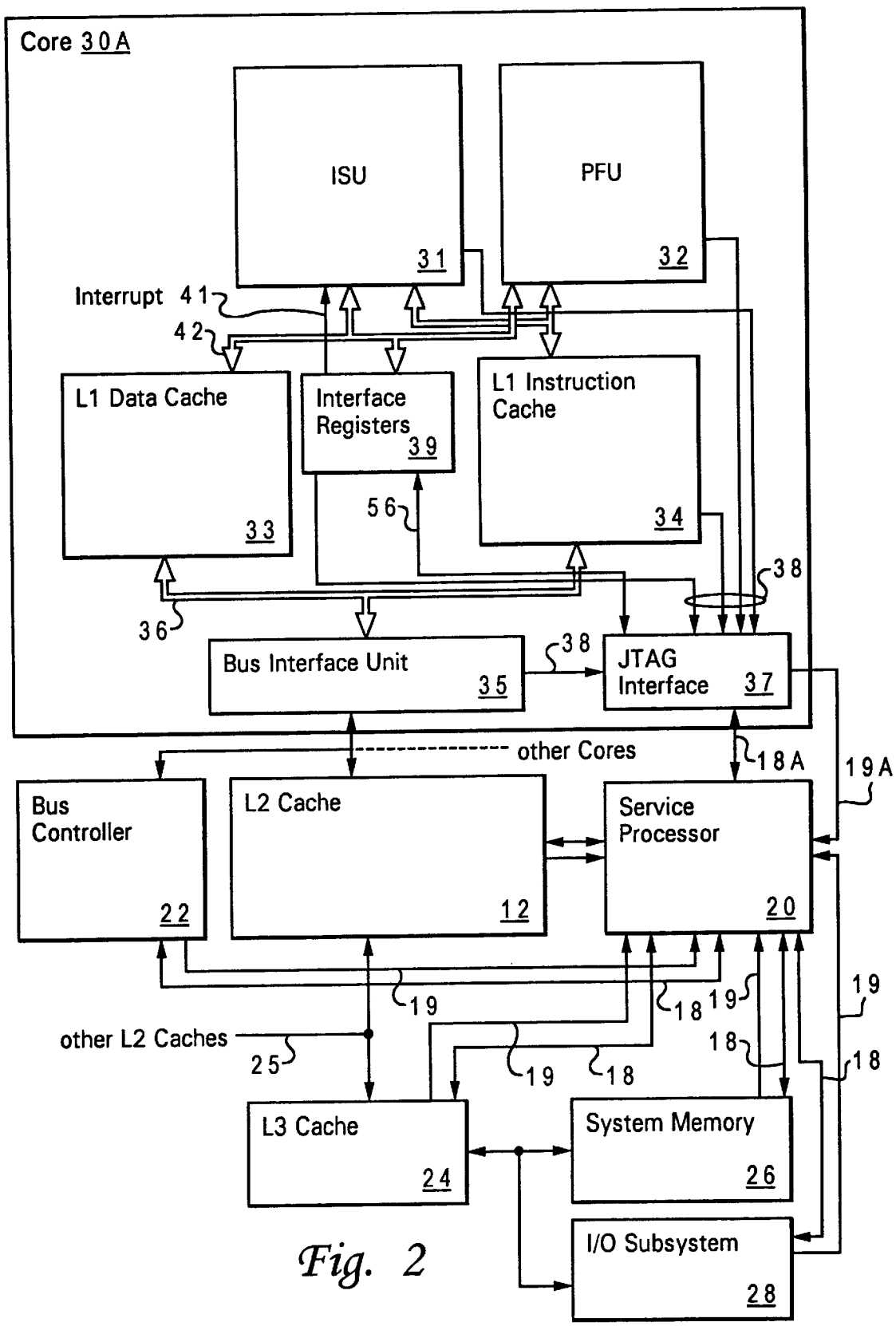
FIG. 2 is a block diagram of a processor and other system components coupled to the service processor from FIG. 1, in accordance with a preferred embodiment of the present invention.

Referring now to FIG. 2, processor core 30A and associated processing system components are shown. An instruction sequencer unit (ISU) 31 and a prefetch unit (PFU) 32 are coupled to two caches. An L1 data cache 33 is used to store operand data, that is, values that are operated on by processor instructions. An L1 instruction cache 34 is used to store instructions to be executed by ISU 31. L1 caches 33 and 34 are coupled to an external bus by bus interface unit 35.

Service processor 20 is coupled to processing system components L2 cache, core 30A, system memory 26, I/O subsystem 28, and L3 cache 24, by a series of JTAG connections 18 and attention lines 19. As described above, attention lines 19 indicate to service processor 20 that a particular block needs attention, and JTAG connections 18 provide the means for querying status and taking remedial measures.

As part of core 30A, JTAG interface 37 is coupled to JTAG connection 18A from service processor 20. Within core 30A, JTAG interface 37 couples to each of ISU 31, PFU 32, L1 caches 33 and 34, and bus interface unit 35, via internal attention lines 38. These internal attention lines allow the individual functional blocks to signal for attention from JTAG interface 37. Typically, internal attention signals 38 are combined in a logical OR operation (although other more complicated schemes, such as priority encoding could be applied) to produce external attention signal 19A which propagates the request for attention to service processor 20. Service processor can then poll JTAG interface 37 via JTAG connection 18A to determine which internal attention signals 38 are active.

The present invention incorporates interface registers 39, which are coupled to JTAG interface 37. These registers allow an operating system executing within core 30A to exchange data via JTAG interface 37, with service processor 20. Multiple registers are used, one for information input from the operating system and one for information output from the operating system. Using separate registers avoids contention problems or the need for arbitration and lock mechanisms to protect the integrity of the information exchanged as would be required in a single shared-register design. Each register may have a command field and an information field, with the command field telling what action the recipient of the information should take, and a data field containing fault recovery information, or optionally a data pointer indicating a memory location containing extended fault recovery information.

A service bus 56 couples interface registers 39 to JTAG interface 37. Service bus 56 is preferably a serial interface having clock and data lines that is used to interface internal blocks of core 30A with JTAG interface 37, but other architectural schemes may be used, such as a parallel bus connection without departing from the scope of the present invention. A special set of commands is provided within the protocol used between JTAG interface 37 and service processor 20 to allow service processor 20 to read values from and write values to interface registers 39. An interrupt 41 is provided from interface registers 39 to ISU 31 and is activated when a register within interface registers 39 is written by JTAG interface 37. This allows service processor 20 to direct the activity of an operating system executing within core 30A in order to provide information to the operating system via interface registers 39.

Interface registers 39 are coupled to an internal bus 42, allowing core 30A to read and write values to interface register 39. One of the attention signals 38 couples interface registers 39 to JTAG interface 37, and is logically combined with other attention signals 38 to produce an attention output 19A for interrupting the activity of service processor 20, so that service processor 20 may issue the proper JTAG commands to read interface registers 39. The attention signal coupled to interface registers 39 is activated when the operating system writes information to interface registers 39.

JTAG interface 37 is a test port serial interface designed for boundary-scan testing of integrated circuits.

The JTAG has also been extended in the prior art to encompass commands to scan internal registers of a processor in order to perform testing, configuration or debugging. Special modes may be used in the processor to allow access to all of the internal registers of a processor. It is not necessary to use the boundary scan protocols to practice the present invention, nor do the boundary scan registers need to be present in the processing system components. JTAG interface 37 is convenient for interfacing to test equipment and can provide the dual connection of a standard test interface, while providing the service processor interface of the present invention.

JTAG interface 37 is a multi-wire connection, including a synchronous clock, serial data input and output signals and a ground return, as described in IEEE standard 1149.1. JTAG provides an efficient connection in terms of pin-out and complexity, and is a highly reliable interface using relatively low speed connections in relation to processor internal and external bus frequencies.

Figure 3:
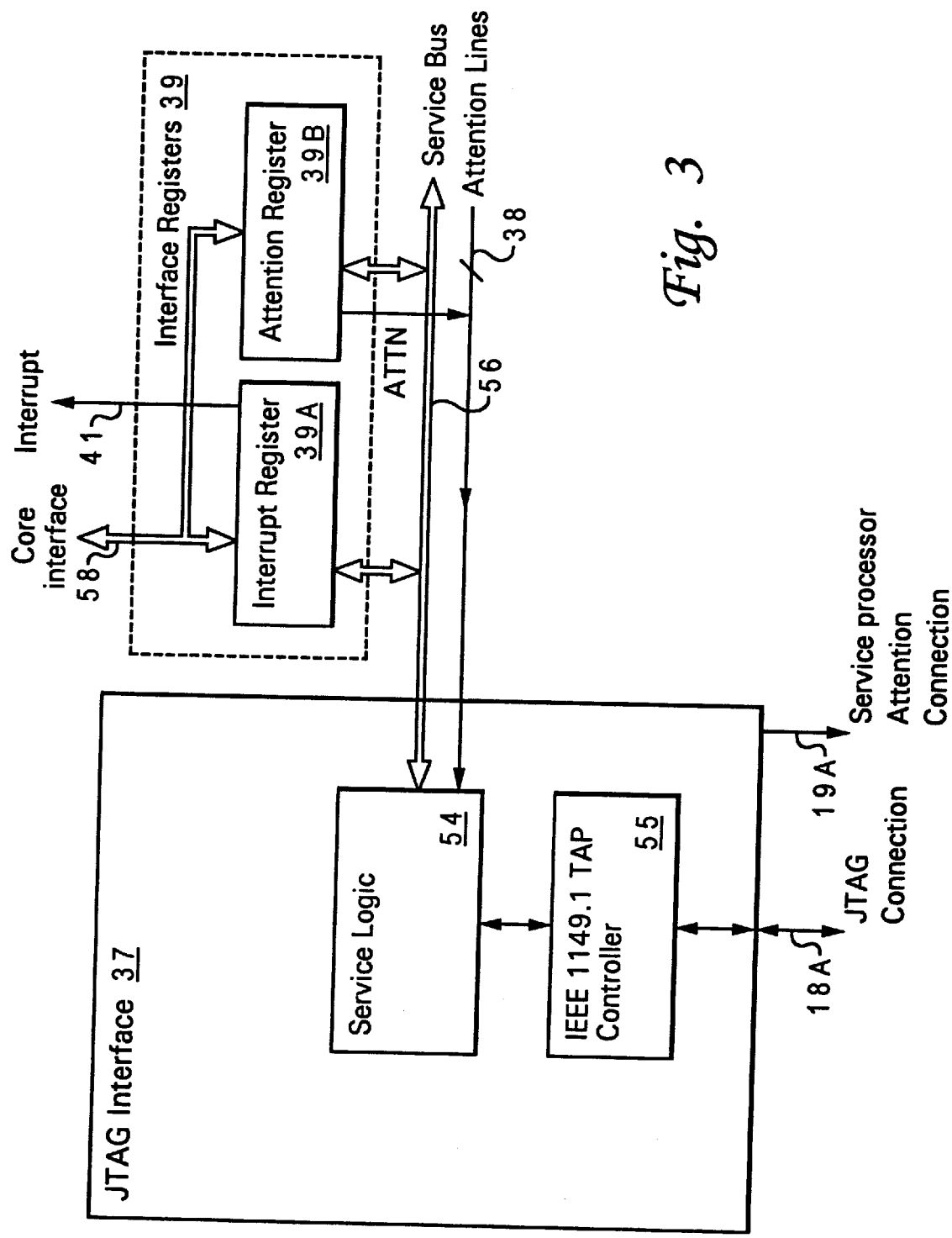
FIG. 3 is a block diagram of the service processor interface from FIG. 1, in accordance with a preferred embodiment of the present invention.

Referring now to FIG. 3, the details of the service processor interface of the present invention is depicted. JTAG Interface 37 can carry boundary scan transaction commands and data, internal control commands for modifying or reading control signals and status within core 30, or commands and data for manipulating interface registers 39 of the present invention. A TAP controller 55 connects the external JTAG connection 18 to service logic 54. Service logic 54 provides the boundary scan interface (if present) and the interface to internal registers of core 30A–30C via service bus 56. Service bus 56 also controls the service processor's 20 access to interface registers 39 via transactions generated by JTAG interface 37 on service bus 56. Attention lines 38 provided from other core 30A functional blocks, including interface registers 39, are also connected to service logic 54 and are combined to provide service processor attention connection 19A.

Service logic 54 decodes the commands from TAP controller 55, and determines whether or not the commands are service bus commands. If a command is an service bus command, a transaction is generated on service bus 56, including commands to read or write interface registers 39. Interface registers 39 contains an interrupt register 39A, so named because in this embodiment, the register to which information is written for the operating system generates an interrupt 41 to core 30A. This register can be read or written by core 30A. The write operation is used to clear the interrupt and provide other control operations for interface to service processor 20. The read operation provides the information that was written by service processor 20 using JTAG commands. Interface registers 39 also contains attention register 39B, so named because in this embodiment, an attention line ATTN is activated upon a write to attention register 39B by core 30A. In order to read and write interface registers 39 special-purpose read and write register instructions are used in the code stream. A move-from special-purpose register (MFSPR) and move-to special-purpose register (MTSPR) command are provided in the instruction set of core 30A.

Figure 4:
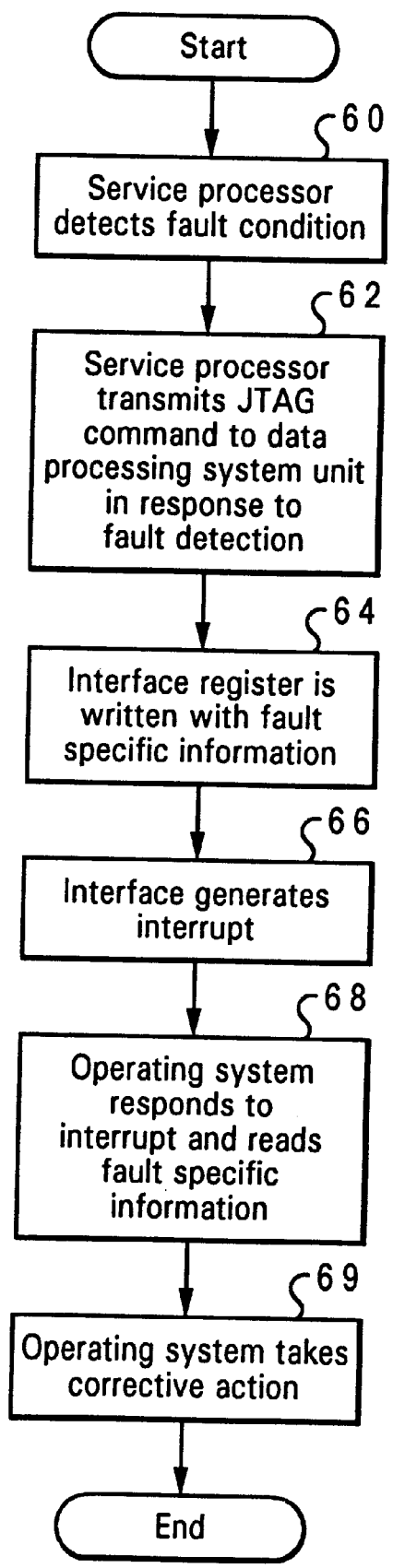
FIG. 4 is a flow diagram of a method of communication between a service processor and an operating system executing within a processor, in accordance with a first embodiment of the present invention.

Referring now to FIG. 4, a first embodiment of a method for communication between a service processor and an operating system is depicted. Service processor 20 detects a fault condition (step 60) and in response, transmits a JTAG command to JTAG interface 37 (step 62). Receipt of the JTAG command causes interface register 39 to be written with specific fault information (step 64) and an interrupt is generated to the operating system (step 66). In response to the interrupt, the operating system reads interrupt register 39A to determine the type of action requested by service processor 20 (step 68) and the operating system takes a specific action based on the information contained in interrupt register 39A (step 69). The operating system then writes interrupt register 39A to clear the interrupt.

An example of fault recovery using the first embodiment of the method is a situation when the service processor can detect a fault, but cannot completely correct the fault or take appropriate action without the cooperation of the operating system executing within the core. For instance, when a cache fault occurs and service processor 20 receives an indication that a cache must be purged, the operating system may be notified to purge the cache by performing a series of memory operations to the cache locations to flush the cache. This may be done either because service processor 20 may not have sufficient control of the cache to perform a purge, or that the operation will be faster when performed by the core.

Figure 5:
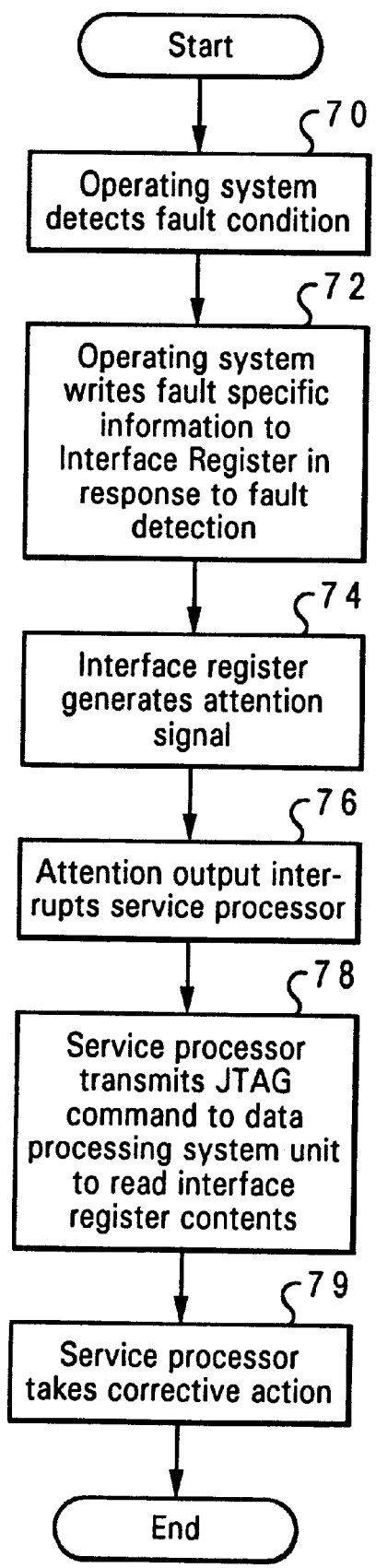
FIG. 5 is a flow diagram of a method of communication between a service processor and an operating system executing within a processor, in accordance with a second embodiment of the present invention.

Referring now to FIG. 5, a second embodiment of a method for communication between a service processor and an operating system is depicted. The operating system executing within core 30A detects a fault condition (step 70), and in response, the operating system writes fault specific information into attention register 39B (step 72). Attention register 39B generates an attention signal 38 (step 74) that causes JTAG interface 37 to assert an attention output 19A, interrupting service processor 20 (step 76). Service processor 20 transmits a JTAG command to JTAG interface 37 to read the information in attention register 39B (step 78) and service processor 20 takes corrective action (step 79).

An example of an operation of the second embodiment of the method is a situation when the operating system may detect a fault but requires the assistance of the service processor to diagnose or correct the fault. Specifically, when a memory controller or other peripheral component has reached a state from which recovery is not possible through operating systems software and the service processor has the appropriate control to reset the faulty component, then the second embodiment of the method allows the operating system to request the service processor perform fault recovery (such as resetting a memory controller).

An extension to the above methods allows for a data transfer larger than interface register's 39 storage capacity. A pointer to a memory location that is accessible to both service processor 20 and core 30A may be placed in a field within interface register 39 and other information within interface register 39 may indicate the value is a pointer to memory. The operating system and service processor 20 can share larger blocks of data in this manner, without requiring transmission of all of the data through JTAG interface 37. This is more efficient since the transfer rate of JTAG interface 37 is orders of magnitude slower than the memory access times required for service processor 20 or core 30A to directly read and write memory.

While the above techniques apply to computer systems, and specifically, to a super-scalar processor system with cache memories, they are adaptable and contemplated to be useful in conjunction with other memory structures and other storage devices within a computer system. For example, the method might be used for coherently modifying a stand-alone cache circuit well as the internal processor cache of the illustrative embodiment.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A data processing system comprising:
    at least one processor having a processor test port;
    at least one memory coupled to said at least one processor;
    a service processor for managing said processing system having a service processor test port interfaced to said processor test port; and
    a register within said at least one processor coupled to said processor test port by a serial interface internal to said at least one processor, for allowing said service processor to exchange with an operating system executing within said at least one processor fault reporting and recovery information of a fault, wherein an indication of said fault is written into said register after said fault has been detected by said at least one processor for indicating a recovery action to said service processor, wherein said fault is a fault in a system component coupled to said at least one processor and said service processor directs a fault recovery within said system component in response to said indication, wherein said exchange of fault reporting and recovery information is made by said service processor sending commands via said service processor test port to said processor test port.

2. The processing system of claim 1, wherein said processor test port comprises a test port in accordance with the Joint Test Action Group specification.

3. The processing system of claim 1, wherein said processor test port further comprises an attention signal provided by said at least one processor and coupled to said service processor for indicating to said service processor that said operating systems program instructions have written data to said register for receipt by said service processor.

4. The processing system of claim 1, wherein said register provides an interrupt indication to said at least one processor for indicating to said at least one processor that said data has been written to said register in response to a command received from said service processor.

5. The processing system of claim 1, wherein said fault is an error in a cache memory coupled to said at least one processor and said service processor purges said cache memory in response to said indication.

6. The processing system of claim 1, wherein said service processor detects a fault and writes an indication of said fault into said register for indicating an action to said at least one processor.

7. The processing system of claim 1, wherein said service processor detects that a cache memory requires purging and writes an indication into said register for indicating to said at least one processor to purge said cache memory.

8. A method for exchanging fault recovery information between a service processor having a service processor test port and an operating system executing within at least one processor, wherein said processor has a processor test port interfaced to said service processor test port, wherein said method comprising:

detecting a fault by said at least one processor in a system component coupled to said at least one processor;

writing fault recovery information in conformance with said detected fault to a register within said at least one processor, wherein said register is dedicated for exchange of said fault recovery information between said operating system and said service processor;

responsive to said writing, transmitting a command from said service processor test port to said processor test port to access said fault recovery information;

responsive to said transmitting, receiving said command at said processor test port;

responsive to said receiving, reading information from said register to accomplish an exchange of said fault recovery information between said operating system and said service processor and providing said information to said service processor for taking an action in conformance with said detected fault; and responsive to said reading, correcting said fault.

9. The method of claim 8, further comprising asserting an attention indication to said service processor in response to said writing.

10. The method of claim 8, wherein said detecting detects a fault in a cache memory sub-system coupled to said at least one processor, and wherein said method further comprises purging said cache, responsive to said reading.

11. A method for exchanging fault recovery information between a service processor having a service processor test port and an operating system executing within at least one processor, wherein said processor has a processor test port interfaced to said service processor test port, wherein said method comprising:

detecting a fault by said at least one processor in a system component coupled to said at least one processor;

transmitting fault recovery information from said service processor test port to said processor test port;

responsive to said transmitting, receiving said command at said processor test port;

responsive to said receiving, writing information in conformance with said detected fault with said fault recovery information to a register within said at least one processor, wherein said register is dedicated for exchange of said fault recovery information between said operating system and said service processor; and responsive to said writing, reading information from said register to accomplish an exchange of said fault recovery information between said operating system and said service processor and providing said information to said service processor for taking an action in conformance with said detected fault; and responsive to said reading, correcting said fault.

12. The method of claim 11, further comprising asserting an interrupt indication to said at least one processor in response to said writing.

13. The method of claim 11, wherein said detecting detects a fault in a cache memory sub-system coupled to said at least one processor, and wherein said method further comprises purging said cache, responsive to said reading.

* * * * *